United States Patent
Wang et al.

(10) Patent No.: US 10,412,137 B2
(45) Date of Patent: Sep. 10, 2019

(54) VIDEO PROCESSING METHOD, MOBILE TERMINAL, AND SERVER

(71) Applicant: TENCENT TECHNOLOGY (SHENZHEN) COMPANY LIMITED, Shenzhen (CN)

(72) Inventors: Huixing Wang, Shenzhen (CN); Zhihao Wang, Shenzhen (CN); Junhong Huang, Shenzhen (CN); Yin Lu, Shenzhen (CN); Minghui Wang, Shenzhen (CN); Haiyou Li, Shenzhen (CN); Shang Yu, Shenzhen (CN); Jun Lin, Shenzhen (CN); Yi Liu, Shenzhen (CN); Jiancheng Lin, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 236 days.

(21) Appl. No.: 14/732,786

(22) Filed: Jun. 8, 2015

(65) Prior Publication Data

US 2015/0312308 A1    Oct. 29, 2015

Related U.S. Application Data

(63) Continuation of application No. PCT/CN2013/083965, filed on Sep. 23, 2013.

(30) Foreign Application Priority Data

Dec. 7, 2012 (CN) .......................... 2012 1 0521394

(51) Int. Cl.
H04L 29/06 (2006.01)
H04L 29/08 (2006.01)
(Continued)

(52) U.S. Cl.
CPC .......... H04L 65/602 (2013.01); G06Q 50/01 (2013.01); H04L 67/32 (2013.01); H04W 4/18 (2013.01)

(58) Field of Classification Search
USPC ........................................ 709/217–219, 232
See application file for complete search history.

(56) References Cited

U.S. PATENT DOCUMENTS 8,548,048 B2 * 10/2013 El-Maleh ......... H04N 21/23406
375/240.05
2008/0052414 A1   2/2008 Panigrahi et al.
(Continued)

FOREIGN PATENT DOCUMENTS

CN    101442662 A    5/2009
CN    201491019 U    5/2010
(Continued)

OTHER PUBLICATIONS

Jing, Jin, Abdelsalam Sumi Helal, and Ahmed Elmagarmid. "Client-server computing in mobile environments." ACM computing surveys (CSUR) 31, No. 2 (1999): 117-157.*
(Continued)

*Primary Examiner* — Suraj M Joshi
*Assistant Examiner* — Melaku Y Habtemariam
(74) *Attorney, Agent, or Firm* — Anova Law Group, PLLC

(57) ABSTRACT

Embodiments of the present invention provide a video processing method, a mobile terminal, and a server. The method may include: sending, by a mobile terminal, a request to a server for pulling status update data of a social network, so that the server acquires original status update data that is requested to be pulled, the original status update data including a source video address; performing, by the server, adaptation processing on the source video address, to
(Continued)

generate an adaptive video address; updating, by the server, the original status update data by using the adaptive video address, to obtain optimized status update data, and returning the optimized status update data to the mobile terminal; and obtaining, by the mobile terminal, adaptive video data according to the adaptive video address in the optimized status update data, and playing the adaptive video data.

18 Claims, 8 Drawing Sheets

(51) Int. Cl.
*H04W 4/18* (2009.01)
*G06Q 50/00* (2012.01)

(56) References Cited

U.S. PATENT DOCUMENTS

| | | | | |
|---|---|---|---|---|
| 2008/0195712 | A1* | 8/2008 | Lin | G06F 3/0486 709/206 |
| 2009/0022473 | A1* | 1/2009 | Cope | H04N 9/8205 386/278 |
| 2010/0149975 | A1* | 6/2010 | Tripathi | H04L 67/04 370/230.1 |
| 2011/0296315 | A1* | 12/2011 | Lin | G06F 17/30905 715/749 |
| 2012/0110110 | A1* | 5/2012 | Luna | H04L 67/22 709/213 |
| 2012/0257628 | A1* | 10/2012 | Bu | H04L 61/2514 370/392 |
| 2012/0278833 | A1* | 11/2012 | Tam | H04N 21/2343 725/31 |
| 2013/0179430 | A1* | 7/2013 | Archambault | G06Q 30/0282 707/711 |

FOREIGN PATENT DOCUMENTS

| | | |
|---|---|---|
| CN | 101951491 A | 1/2011 |
| CN | 101951508 A | 1/2011 |
| CN | 102209276 A | 10/2011 |
| CN | 102802138 A | 11/2012 |
| WO | WO2000076219 A1 * | 12/2000 |

OTHER PUBLICATIONS

The World Intellectual Property Organization (WIPO) International Search Report for PCT/CN2013/083965 dated Jan. 2, 2014.

The State Intellectual Property Office of the People's Republic of China (SIPO) Office Action 1 for 201510521394.6 dated Oct. 30, 2017 12 Pages (including translation).

* cited by examiner

VIDEO PROCESSING METHOD, MOBILE TERMINAL, AND SERVER

RELATED APPLICATION

This patent application is a continuation application of PCT application no. PCT/CN2013/083965, filed on Sep. 23, 2013, which claims priority to Chinese Patent Application No. 201210521394.6, entitled "VIDEO PROCESSING METHOD, MOBILE TERMINAL, AND SERVER" filed on Dec. 7, 2012, which is incorporated by reference in its entirety.

FIELD OF THE TECHNOLOGY

The present disclosure relates to the field of Internet technologies and, in particular, to a video processing method, a mobile terminal, and a server.

BACKGROUND OF THE DISCLOSURE

In a social network, a user can see content published by a friend of the user including, for example, a sentence shared by a friend A, a blog posted by a friend B, and a photo uploaded by a friend C. Such content is referred to as status updates, and data for carrying such status updates is called status update data. At present, most social networks support that the status update data includes video information. For example, a friend D of a user shares a video in a microblog. When the user enters the microblog of the friend D, the user can view the status update data of the friend D, which includes an address of the video shared by the friend D or a thumbnail that includes an address of the video. When the user clicks the address of the video or the thumbnail of the video, a web page corresponding to the address of the video can be opened to play the video.

A conventional web page is designed based on a personal computer (PC) client. When a user opens a web page corresponding to an address of a video in the status update data by using a mobile terminal, under the limit of the size of a screen of the mobile terminal and due to a system difference between the mobile terminal and a PC client, the effect of video playback on the web page is affected. Also referring to FIG. 1, FIG. 1 is a schematic diagram of video playback by an existing mobile terminal.

As shown in FIG. 1, for a web page in the mobile terminal, when a video is played, a video playback area on the web page is small, and advertisement information, recommendation information, comment information, and the like on the web page are presented around the video playback area, so that video playback effect is impacted, intelligence of the mobile terminal is reduced, and product competitiveness of a social network is also reduced.

SUMMARY

In the existing technology, when a mobile terminal plays a video on a web page, a problem of a small video playback area and a poor video playback effect exists, which reduces intelligence of the mobile terminal and product competitiveness of a social network.

In view of this, according to an aspect of the present disclosure, a video processing method, a mobile terminal, and a server are provided, which can convert a video in status update data in a social network into an adaptive video suitable for a mobile terminal to play, thereby improving the video playback effect, improving intelligence of the mobile terminal, and also improving product competitiveness of the social network.

The video processing method includes: sending, by a mobile terminal, a request to a server for pulling status update data of a social network, so that the server acquires original status update data that is requested to be pulled, the original status update data including a source video address; performing, by the server, adaptation processing on the source video address, to generate an adaptive video address; updating, by the server, the original status update data by using the adaptive video address, to obtain optimized status update data, and returning the optimized status update data to the mobile terminal; and obtaining, by the mobile terminal, adaptive video data according to the adaptive video address in the optimized status update data, and playing the adaptive video data.

Correspondingly, according to another aspect of the present disclosure, another video processing method is further provided, and may include: sending, by a mobile terminal, a request for pulling status update data of a social network to a server, so that the server processes original status update data that is requested to be pulled, and generates optimized status update data, the original status update data including a source video address, and the optimized status update data including an adaptive video address generated by performing adaptation processing on the source video address; receiving, by the mobile terminal, the optimized status update data returned by the server; and obtaining, by the mobile terminal, adaptive video data according to the adaptive video address in the optimized status update data, and playing the adaptive video data.

Correspondingly, according to still another aspect of the present disclosure, a video processing method is further provided, and includes: acquiring, by a server according to a request that is sent by a mobile terminal and for pulling status update data of a social network, original status update data that is requested to be pulled, the original status update data including a source video address; performing, by the server, adaptation processing on the source video address, to generate an adaptive video address; and updating, by the server, the original status update data by using the adaptive video address, to obtain optimized status update data, and returning the optimized status update data to the mobile terminal, so that the mobile terminal obtains adaptive video data according to the adaptive video address in the optimized status update data, and plays the adaptive video data.

Correspondingly, according to another aspect of the present disclosure, a mobile terminal is further provided, and includes: a status update pull module configured to send a request to a server for pulling status update data of a social network, so that the server pulls original status update data, and processes the original status update data to generate optimized status update data, wherein the original status update data includes a source video address, and the optimized status update data includes an adaptive video address generated by performing adaptation processing on the source video address; a data receiving module configured to receive the optimized status update data returned by the server; and a video playback module configured to obtain adaptive video data according to the adaptive video address in the optimized status update data, and play the adaptive video data.

Correspondingly, according to still another aspect of the present disclosure, a server is further provided, which includes: a status update acquisition module configured to acquire original status update data that is requested to be pulled, the original status update data including a source video address; an adaptation processing module configured to perform adaptation processing on the source video address, to generate an adaptive video address; a status update module configured to update the original status update data by using the adaptive video address to obtain optimized status update data; and a data returning module configured to return the optimized status update data to a mobile terminal, so that the mobile terminal obtains adaptive video data according to the adaptive video address in the optimized status update data, and plays the adaptive video data.

In the aspects of the present disclosure, a server converts a source video address in status update data into an adaptive video address suitable for a mobile terminal, so that the mobile terminal can acquire, according to the adaptive video address, adaptive video data suitable for the mobile terminal to play. Therefore, by applying the aspects of the present disclosure, an effect of video playback and intelligence of a mobile terminal are improved, product competitiveness of a social network is also improved, and user stickiness of the social network is increased.

BRIEF DESCRIPTION OF THE DRAWINGS

To describe the technical solutions in the embodiments of the present invention or in the existing technology more clearly, the following briefly introduces the accompanying drawings for describing the embodiments or the existing technology. Apparently, the accompanying drawings merely show some embodiments of the present invention, and those ordinary skilled in the art may derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. The described embodiments are certain exemplary embodiments of the present invention, and other embodiments can be obtained by a person of ordinary skill in the art based on the disclosed embodiments without creative efforts shall fall within the protection scope of the present disclosure.

In an embodiment of the present invention, original status update data refers to the status update data without adaptation processing. For example, a friend E of a user shares a video in a social network, the status update data carrying information of the sharing includes a source video address of the video shared by the friend E, and then the status update data including the source video address is referred to as original status update data. Optimized status update data refers to the status update data generated after adaptation processing is performed on the original status update data. For example, in the above scenario, when the user enters the social network by using a mobile terminal to view the status update data of the friend E, a server performs adaptation processing on the source video address in the original status update data shared by the friend E to generate an adaptive video address, and then the status update data including the adaptive video address is referred as the optimized status update data. The mobile terminal includes, but is not limited to, any mobile device, such as a notebook computer, a tablet computer, a mobile phone, a smartphone, an e-reader, and a personal digital assistant (PDA).

The following introduces video processing methods in the embodiments of the present invention in detail with reference to FIG. 2 to FIG. 7.

Figure 2:
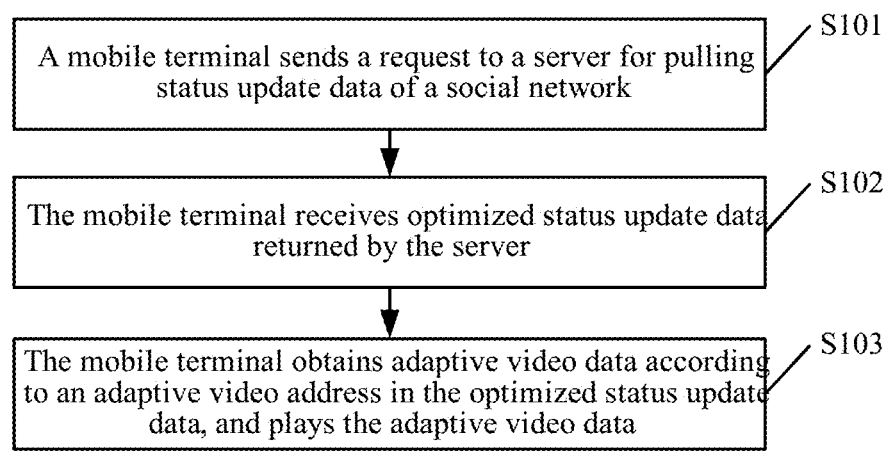
FIG. 2 illustrates a flowchart of a video processing method according to an embodiment of the present invention.

Referring to FIG. 2, FIG. 2 is a flowchart of a video processing method according to an embodiment of the present invention. In this embodiment of the present invention, a procedure of video processing from a mobile terminal side is elaborated. The method may include at least step S101 to step S103 below.

In step S101, a mobile terminal sends a request to a server for pulling status update data of a social network, so that the server processes the original status update data that is requested to be pulled, and generates optimized status update data.

In this embodiment of the present invention, the original status update data includes a source video address, and the optimized status update data includes an adaptive video address generated by the adaptation processing on the source video address. The source video address is generally a link address of a Hypertext Markup Language (HTML) web page, and the source video address may be presented in the original status update data in a form of a character string, or may be included in a video thumbnail and presented in the original status update data. The adaptive video address may be presented in the optimized status update data in a form of a character string, or may be included in a video thumbnail and presented in the optimized status update data.

The mobile terminal may send the request for pulling to the server in various ways. For example, the mobile terminal is yet to log in to the social network, and then the mobile terminal may send, according to a login operation of a user, a request for logging in to the social network to the server, and add a request for pulling status update data to the login request; and while responding to the login request, the server responds to the request for pulling, and the user of the mobile terminal can view the status update data after logging in to the social network.

Alternatively, when the mobile terminal has logged in to the social network, and according to a pulling operation of a user, for example, a pulling operation on an information presentation page of the social network, or a click on a status update data pulling button on an information presentation page of the social network, or selection of a status update data pulling option in a menu provided on an information presentation page of the social network, the mobile terminal may send a request for pulling the status update data to the server.

In step S102, the mobile terminal receives the optimized status update data returned by the server.

In an embodiment of the present invention, after performing adaptation processing on a video address included in the original status update data and generating an adaptive video address, the server replaces the source video address in the original status update data with the adaptive video address, thereby obtaining the optimized status update data. In this step, the mobile terminal receives the optimized status update data returned by the server. It should be noted that after obtaining the optimized status update data, the mobile terminal presents the optimized status update data to the user. The adaptive video address may be presented in the optimized status update data in a form of a character string, or may be included in a video thumbnail and presented in the optimized status update data.

In step S103, the mobile terminal obtains adaptive video data according to an adaptive video address in the optimized status update data, and plays the adaptive video data.

In an embodiment of the present invention, when the mobile terminal detects that a user clicks a character string of the adaptive video address in the optimized status update data or clicks a thumbnail that includes the adaptive video address, the mobile terminal acquires the adaptive video data according to the adaptive video address, and plays the adaptive video data. It should be noted that the adaptive video data may be video data in various formats that is suitable for the mobile terminal to play, and the formats include, but are not limited to: a Moving Picture Experts Group Audio Layer IV (MP4) format, an IFRAME (frame) format, an H.264 format, and a Flash format.

In this embodiment of the present invention, being suitable for the mobile terminal to play means that when the mobile terminal plays the adaptive video data, a playback area generally occupies an entire screen of the mobile terminal, which may have a desired video playback effect. For example, the adaptive video data may be video data in the MP4 format, and then the mobile terminal may perform full-screen playback by using a system player; or the adaptive video data may be video data in the IFRAME format, and then the mobile terminal may perform full-screen playback by using a browser; or the adaptive video data may be video data in the H.264 format, and then the mobile terminal may perform full-screen playback by using an HTML5 player; or the adaptive video data may also be video data in the Flash format, and then the mobile terminal performs full-screen playback by using a Flash player; and the like.

In this embodiment of the present invention, a server converts a source video address in the status update data into an adaptive video address suitable for a mobile terminal, so that the mobile terminal can acquire, according to the adaptive video address, adaptive video data suitable for the mobile terminal to play. Therefore, by means of this embodiment of the present invention, not only an effect of video playback and intelligence of a mobile terminal are improved, but also product competitiveness of a social network is improved and user stickiness of the social network is increased.

According to another embodiment of the present invention, another video processing method is further provided.

Figure 3:
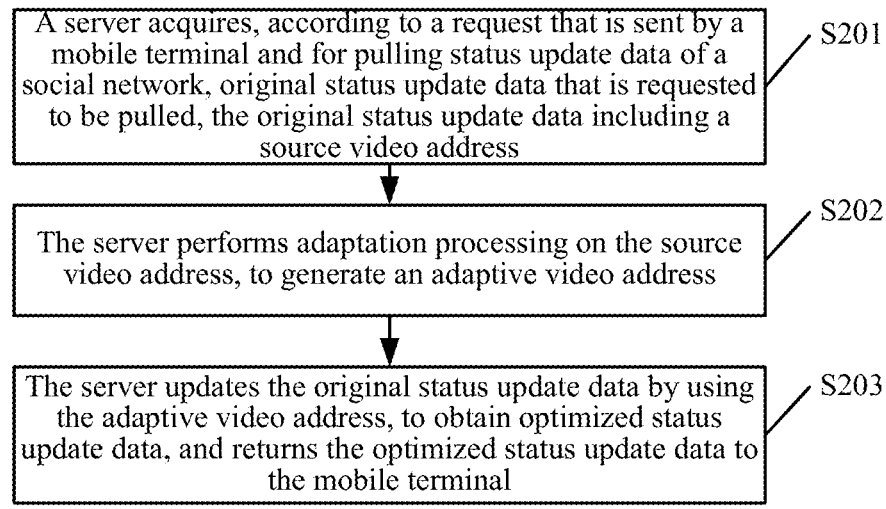
FIG. 3 illustrates a flowchart of a video processing method according to another embodiment of the present invention.

Referring to FIG. 3, FIG. 3 is a flowchart of a video processing method according to another embodiment of the present invention. In this embodiment of the present invention, a procedure of video processing from the server side is elaborated. The method at least may include step S201 to step S203 below.

In step S201, a server acquires, according to a request that is sent by a mobile terminal for pulling status update data of a social network, original status update data that is requested to be pulled, the original status update data including a source video address.

In an embodiment of the present invention, the source video address is generally a link address of an HTML web page, and the source video address may be presented in the original status update data in a form of a character string, or may be included in a video thumbnail and presented in the original status update data.

In step S202, the server performs adaptation processing on the source video address, to generate an adaptive video address. The server may performs adaptation processing on the source video address in various ways. One implementation may include: calling a video conversion interface of a third-party video website, and converting the source video address into an adaptive video address suitable for the mobile terminal, so that the mobile terminal can directly acquire, from the third-party video website by using the adaptive video address, adaptive video data suitable for the mobile terminal to play. Another implementation may include: adding an address of a proxy common gateway interface (CGI) in the server to a field of the source video address to generate an adaptive video address; and obtaining adaptive video data, suitable for the mobile terminal to play, by the mobile terminal from the third-party video website by using the proxy CGI in the server by calling the adaptive video address.

In step S203, the server updates the original status update data by using the adaptive video address to obtain optimized status update data, and returns the optimized status update data to the mobile terminal, so that the mobile terminal obtains adaptive video data according to the adaptive video address in the optimized status update data, and plays the adaptive video data.

In this embodiment of the present invention, a server converts a source video address in the status update data into an adaptive video address suitable for a mobile terminal, so that the mobile terminal can acquire, according to the adaptive video address, adaptive video data suitable for the mobile terminal to play. Therefore, according to this embodiment of the present invention, not only an effect of video playback and intelligence of a mobile terminal are improved, but also product competitiveness of a social network is improved and user stickiness of the social network is increased.

According to another embodiment of the present invention, another video processing method is further provided.

Figure 4:
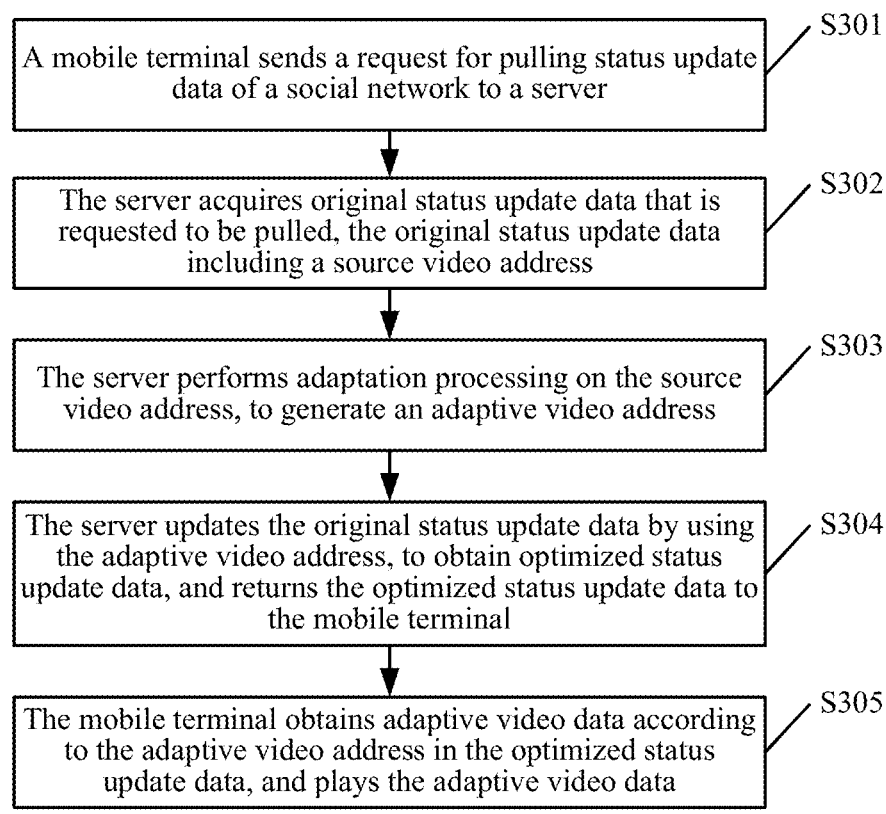
FIG. 4 illustrates a flowchart of a video processing method according to another embodiment of the present invention.

Referring to FIG. 4, FIG. 4 is a flowchart of a video processing method according to another embodiment of the present invention. In this embodiment of the present invention, a procedure of video processing between a mobile terminal and a server is elaborated. The method may include at least step S301 to step S305 below.

In step S301, a mobile terminal sends a request for pulling status update data of a social network to a server. In this embodiment of the present invention, for this step, reference may be made to step S101 in the embodiment shown in FIG. 1, and details are not further described herein.

In step S302, the server acquires original status update data that is requested to be pulled, the original status update data including a source video address.

In step S303, the server performs adaptation processing on the source video address, to generate an adaptive video address.

In step S304, the server updates the original status update data by using the adaptive video address to obtain optimized status update data, and returns the optimized status update data to the mobile terminal.

In this embodiment of the present invention, for step S302 to step S304, reference may be made to step S201 to step S203 in the embodiment shown in FIG. 2, and details are not further described herein.

In step S305, the mobile terminal obtains adaptive video data according to the adaptive video address in the optimized status update data, and plays back the adaptive video data.

Figure 1:
FIG. 1 is a schematic diagram of video playback by an existing mobile terminal.
Figure 5:
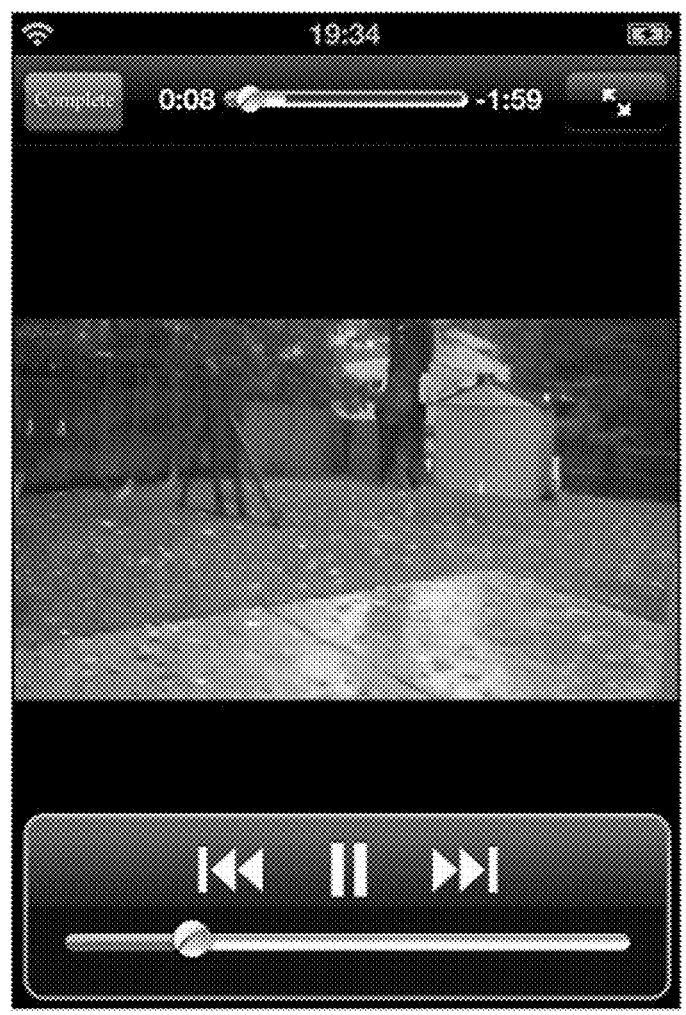
FIG. 5 illustrates a schematic diagram of video playback by a mobile terminal according to an embodiment of the present invention.

In this embodiment of the present invention, for this step, reference may be made to step S103 in the embodiment shown in FIG. 1, and details are not further described herein. Also referring to FIG. 5, FIG. 5 is a schematic diagram of video playback by a mobile terminal according to an embodiment of the present invention. As shown in FIG. 5, when the mobile terminal plays the adaptive video data, a playback area occupies an entire screen of the mobile terminal, so that a user obtains a desired video playback effect.

In this embodiment of the present invention, a server converts a source video address in the status update data into an adaptive video address suitable for a mobile terminal, so that the mobile terminal can acquire, according to the adaptive video address, adaptive video data suitable for the mobile terminal to play. Therefore, according to this embodiment of the present invention, not only the video playback effect and intelligence of a mobile terminal are improved, but also product competitiveness of a social network is improved and user stickiness of the social network is increased.

According to another embodiment of the present invention, another video processing method is further provided.

Figure 6:
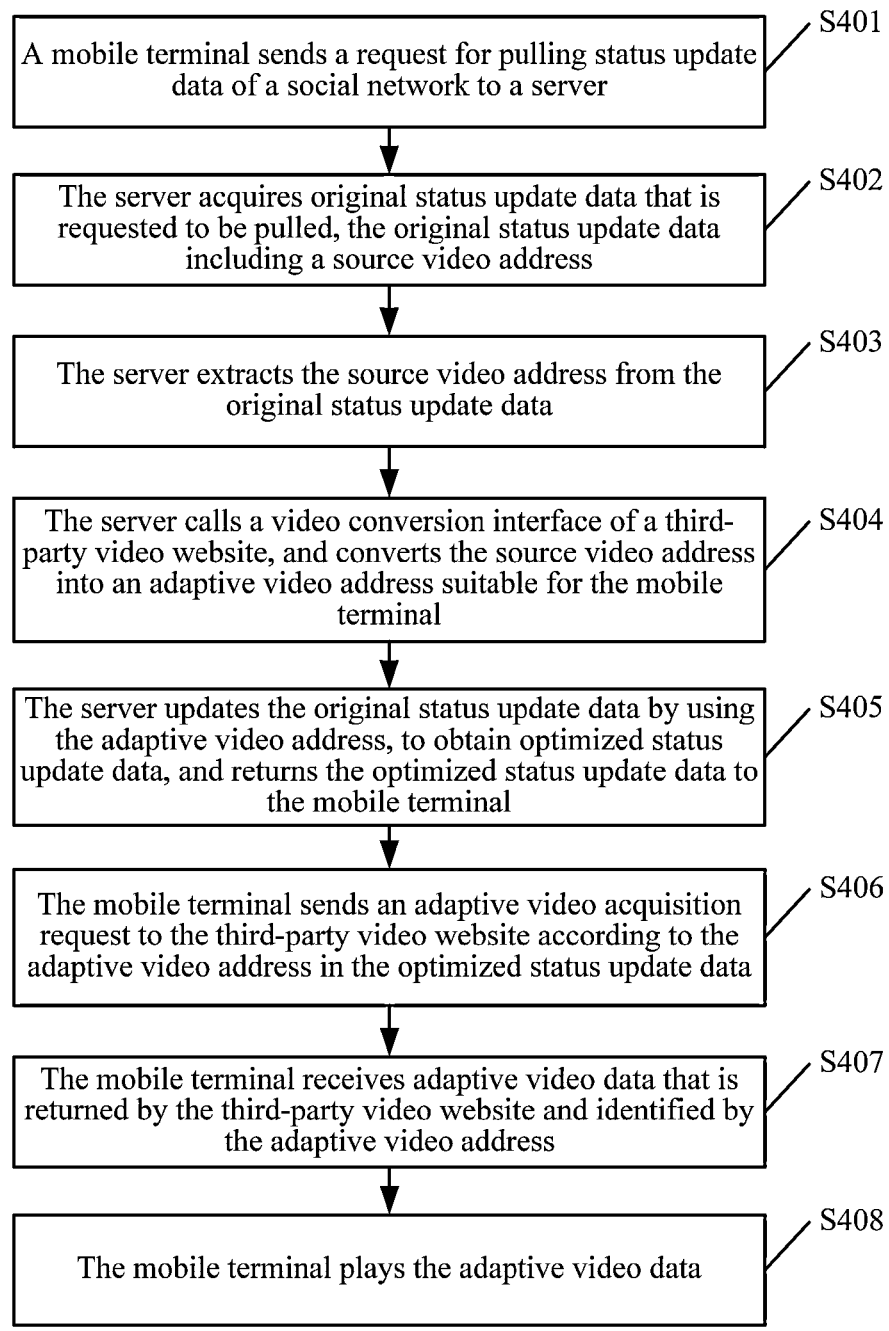
FIG. 6 illustrates a flowchart of a video processing method according to another embodiment of the present invention.

Referring to FIG. 6, FIG. 6 is a flowchart of a video processing method according to another embodiment of the present invention. In this embodiment of the present invention, a procedure of video processing between a mobile terminal and a server is elaborated. The method may include at least step S401 to step S408 below.

In step S401, a mobile terminal sends a request to a server for pulling status update data of a social network.

In step S402, the server acquires original status update data that is requested to be pulled, which includes a source video address.

In step S403, the server extracts the source video address from the original status update data.

In step S404, the server calls a video conversion interface of a third-party video website, and converts the source video address into an adaptive video address suitable for the mobile terminal.

In step S405, the server updates the original status update data by using the adaptive video address to obtain optimized status update data, and returns the optimized status update data to the mobile terminal.

In step S406, the mobile terminal sends an adaptive video acquisition request to the third-party video website according to the adaptive video address in the optimized status update data.

In step S407, the mobile terminal receives adaptive video data that is returned by the third-party video website and identified by the adaptive video address.

In step S408, the mobile terminal plays the adaptive video data.

In this embodiment of the present invention, before a server returns the status update data to a mobile terminal, conversion from a source video address into an adaptive video address and the optimization processing of a video are completed, and the adaptive video address is transmitted, together with optimized status update data, to the mobile terminal. The mobile terminal can rapidly obtain adaptive video data according to the adaptive video address and play the adaptive video data, thereby improving a response speed of playback, and improving performance of the mobile terminal.

In this embodiment of the present invention, a server converts a source video address in the status update data into an adaptive video address suitable for a mobile terminal, so that the mobile terminal can acquire, according to the adaptive video address, adaptive video data suitable for the mobile terminal to play. Therefore, by means of this embodiment of the present invention, not only the video playback effect and intelligence of a mobile terminal are improved, but also product competitiveness of a social network is improved and user stickiness of the social network is increased.

According to another embodiment of the present invention, another video processing method is further provided.

Figure 7:
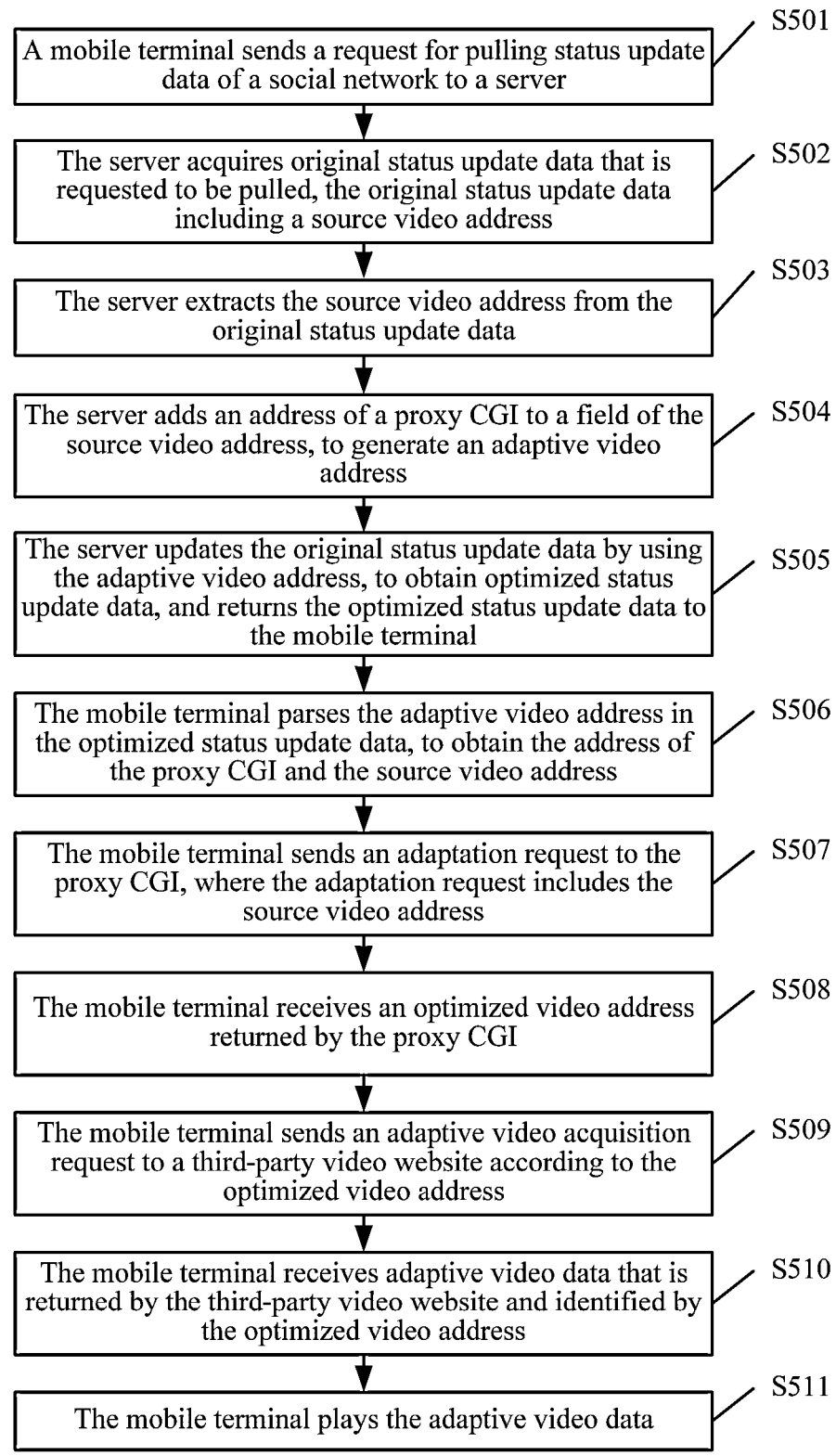
FIG. 7 illustrates a flowchart of a video processing method according to another embodiment of the present invention.

Referring to FIG. 7, FIG. 7 is a flowchart of a video processing method according to another embodiment of the present invention. In this embodiment of the present invention, a procedure of video processing between a mobile terminal and a server is elaborated. The method may include at least step S501 to step S511 below.

In step S501, a mobile terminal sends a request to a server for pulling status update data of a social network.

In step S502, the server acquires original status update data that is requested to be pulled, the original status update data including a source video address.

In step S503, the server extracts the source video address from the original status update data.

In step S504, the server adds an address of a proxy CGI to a field of the source video address to generate an adaptive video address.

In step S505, the server updates the original status update data by using the adaptive video address to obtain optimized status update data, and returns the optimized status update data to the mobile terminal.

In step S506, the mobile terminal parses the adaptive video address in the optimized status update data, to obtain the address of the proxy CGI and the source video address.

In step S507, the mobile terminal sends an adaptation request to the proxy CGI, where the adaptation request includes the source video address, so that the proxy CGI calls a video conversion interface of a third-party video website, and converts the source video address into an optimized video address suitable for the mobile terminal.

In step S508, the mobile terminal receives the optimized video address returned by the proxy CGI.

In step S509, the mobile terminal sends an adaptive video acquisition request to the third-party video website according to the optimized video address.

In step S510, the mobile terminal receives adaptive video data that is returned by the third-party video website and identified by the optimized video address.

In step S511, the mobile terminal plays the adaptive video data.

In this embodiment of the present invention, before the server returns status update data to the mobile terminal, only an address of a proxy CGI is added to a source video address, and address conversion does not depend on a third-party video website, thereby avoiding a time delay caused by address conversion, and ensuring rapid and normal output of the status update data.

In addition, the mobile terminal calls, by using the proxy CGI, a video conversion interface of the third-party video website to perform address conversion only when the mobile terminal needs to play a video in the status update data. Therefore, in such a on-demand video processing manner, more flexible optimization processing can be performed on a video in the status update data, thereby reducing an unnecessary operation of address conversion, and reducing resource consumption.

In this embodiment of the present invention, the server converts a source video address in status update data into an adaptive video address suitable for a mobile terminal, so that the mobile terminal can acquire, according to the adaptive video address, adaptive video data suitable for the mobile terminal to play. Thus, not only the video playback effect and intelligence of a mobile terminal are improved, but also product competitiveness of a social network is improved and user stickiness of the social network is increased.

According to another embodiment of the present invention, a mobile terminal is further provided.

Figure 8:
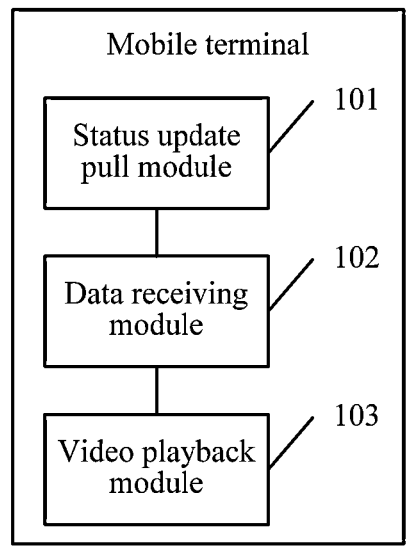
FIG. 8 illustrates a schematic structural diagram of a mobile terminal according to an embodiment of the present invention.
Figure 9:
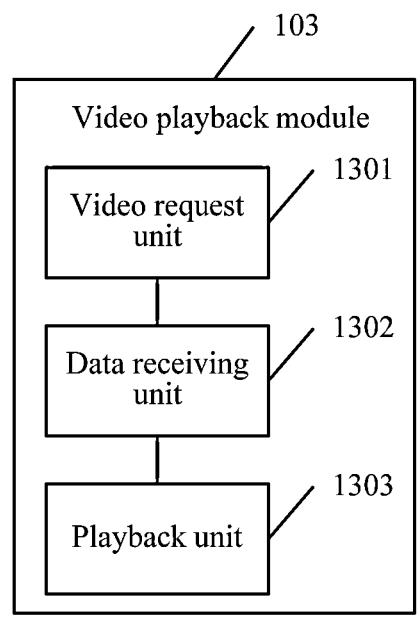
FIG. 9 illustrates a schematic structural diagram of an embodiment of a video playback module according to FIG. 8.
Figure 10:
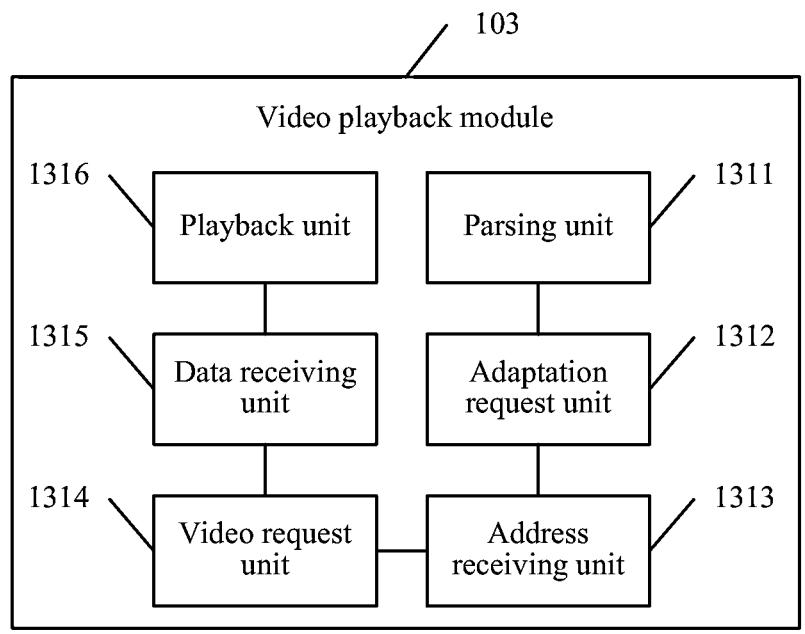
FIG. 10 illustrates a schematic structural diagram of another embodiment of a video playback module according to FIG. 8.

The following introduces the mobile terminal provided in this embodiment of the present invention in detail with reference to FIG. 8 to FIG. 10. It should be noted that the mobile terminal described below is applicable to the foregoing methods shown in FIG. 2 to FIG. 7.

Referring to FIG. 8, FIG. 8 is a schematic structural diagram of a mobile terminal according to an embodiment of the present invention. In this embodiment of the present invention, the mobile terminal may include: a status update pull module 101, a data receiving module 102, and a video playback module 103.

The status update pull module 101 is configured to send a request to a server for pulling status update data of a social network, so that the server pulls original status update data, and processes the original status update data to generate optimized status update data. The original status update data includes a source video address, and the optimized status update data includes an adaptive video address generated by performing adaptation processing on the source video address.

The data receiving module 102 is configured to receive the optimized status update data returned by the server.

The video playback module 103 is configured to obtain adaptive video data according to the adaptive video address in the optimized status update data, and to play back the adaptive video data.

It should be noted that the adaptive video data may be video data in various formats that is suitable for the mobile terminal to play, and the formats include, but are not limited to: an MP4 format, an IFRAME format, an H.264 format, and a Flash format. Being suitable for the mobile terminal to play means that when the mobile terminal plays the adaptive video data, a playback area generally occupies an entire screen of the mobile terminal, which may have a desired video playback effect.

The video playback module 103 may be implemented in various ways. In one implementation, also referring to FIG. 9, which is a schematic structural diagram of an embodiment of the video playback module 103 shown in FIG. 8, the video playback module 103 may include a video request unit 1301, a data receiving unit 1302, and a playback unit 1303.

The video request unit 1301 is configured to send an adaptive video acquisition request to the third-party video website according to the adaptive video address in the optimized status update data. The data receiving unit 1302 is configured to receive the adaptive video data that is returned by the third-party video website and identified by the adaptive video address. The playback unit 1303 is configured to play the adaptive video data.

The adaptive video address is an adaptive video address that is suitable for the mobile terminal and generated by converting the source video address, where the conversion of the source video address is performed by the server by calling a video conversion interface of the third-party video website.

In another implementation, also referring to FIG. 10, which is a schematic structural diagram of another embodiment of the video playback module shown in FIG. 8, the video playback module 103 may include: a parsing unit 1311, an adaptation request unit 1312, an address receiving unit 1313, a video request unit 1314, a data receiving unit 1315, and a playback unit 1316.

The parsing unit 1311 is configured to parse the adaptive video address in the optimized status update data, to obtain an address of a proxy CGI and the source video address. The adaptation request unit 1312 is configured to send an adaptation request to the proxy CGI, where the adaptation request includes the source video address, so that the proxy CGI calls a video conversion interface of a third-party video website, and converts the source video address into an optimized video address suitable for the mobile terminal.

The address receiving unit 1313 is configured to receive the optimized video address returned by the proxy CGI. The video request unit 1314 is configured to send an adaptive video acquisition request to the third-party video website according to the optimized video address. The data receiving unit 1315 is configured to receive the adaptive video data that is returned by the third-party video website and identified by the optimized video address. The playback unit 1316 is configured to play the adaptive video data.

The adaptive video address is an adaptive video address generated by adding the address of the proxy CGI to a field of the source video address by the server.

It can be understood that the video request unit 1301 shown in FIG. 9 and the video request unit 1314 shown in FIG. 10 may be a same functional unit, the data receiving unit 1302 shown in FIG. 9 and the data receiving unit 1315 shown in FIG. 10 may be a same functional unit, and the playback unit 1303 shown in FIG. 9 and the playback unit 1316 shown in FIG. 10 may be a same functional unit.

In other embodiments of the present invention, the video processing method shown in FIG. 2 may be a human-computer interaction method performed by the units in the mobile terminal shown in FIG. 8 to FIG. 10. For example, step S101 shown in FIG. 2 and step S301 shown in FIG. 4 may be performed by the status update acquisition module 101 shown in FIG. 8. Step S102 shown in FIG. 2 may be performed by the data receiving module 102 shown in FIG. 8. Step S103 shown in FIG. 2 may be performed by the video playback module 103 shown in FIG. 8. Step S406 shown in FIG. 6 may be performed by the video request unit 1301 shown in FIG. 9. Step S407 shown in FIG. 6 may be performed by the data receiving unit 1302 shown in FIG. 9. Step S408 shown in FIG. 6 may be performed by the playback unit 1303 shown in FIG. 9. Step S506 shown in FIG. 7 may be performed by the parsing unit 1311 shown in FIG. 10. Step S507 shown in FIG. 7 may be performed by the adaptation request unit 1312 shown in FIG. 10. Step S508 shown in FIG. 7 may be performed by the address receiving unit 1313 shown in FIG. 10. Step S509 shown in FIG. 7 may be performed by the video request unit 1314 shown in FIG. 10. Step S510 shown in FIG. 7 may be performed by the data receiving unit 1315 shown in FIG. 10. Step S511 shown in FIG. 7 may be performed by the playback unit 1316 shown in FIG. 10.

In other embodiments of the present invention, the units in the mobile terminal shown in FIG. 8 may be separately or all combined into one or several other units, or some unit(s) of the units may further be separated into multiple functionally subdivided units. In this way, a same operation can be implemented without affecting an implementation of a technical effect of this embodiment of the present invention. The foregoing units are divided based on logical functions; in an actual application, a function of one unit may also be implemented by multiple units, or functions of multiple units are implemented by one unit. In other embodiments of the present invention, the mobile terminal may also include other modules. However, in an actual application, these functions may also be implemented with the assistance of other units, and may be implemented by multiple units collaborating with one another.

In other embodiments of the present invention, a computer program (including program code) that can execute the video processing methods shown in FIG. 2, FIG. 4, and FIG. 6 to FIG. 9 may run on a computing device, such as a computer that includes a processing component and a storage medium such as a central processing unit (CPU), a random access memory (RAM), or a read-only memory (ROM), to construct the mobile terminal shown in FIG. 8, and to implement the video processing method according to embodiments of the present invention. The computer program may be recorded in, for example, a computer-readable storage medium, and loaded into the foregoing computing device by using the computer-readable storage medium, and run on the computing device.

It should be noted that the structure and function of the mobile terminal in the foregoing embodiment can be specifically implemented by using the method in the foregoing method embodiment; for the specific implementation process, reference may be made to related descriptions in the foregoing method, and details are not further described herein.

In this embodiment of the present invention, a server converts a source video address in status update data into an adaptive video address suitable for a mobile terminal, so that the mobile terminal can acquire, according to the adaptive video address, adaptive video data suitable for the mobile terminal to play. Thus, not only video playback effect and intelligence of a mobile terminal are improved, but also product competitiveness of a social network is improved and user stickiness of the social network is increased.

According to another embodiment of the present invention, a server is further provided.

Figure 11:
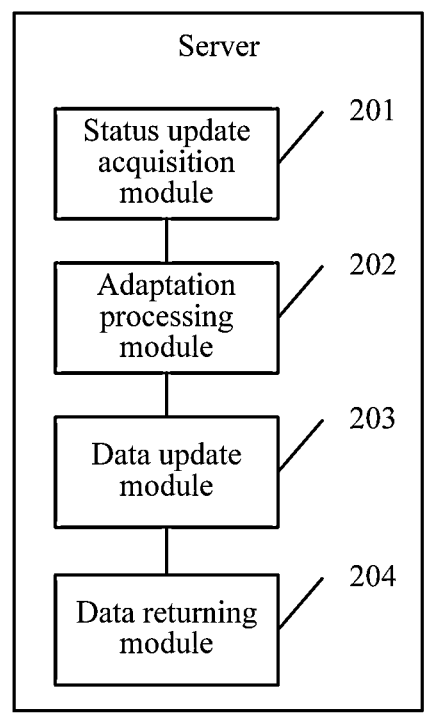
FIG. 11 illustrates a schematic structural diagram of a server according to an embodiment of the present invention.
Figure 12:
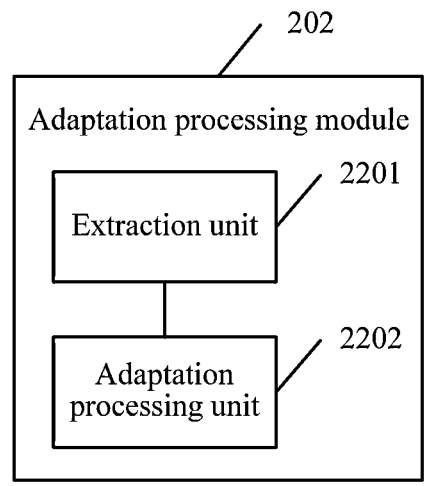
FIG. 12 illustrates a schematic structural diagram of an embodiment of an adaptation processing module according to FIG. 11.
Figure 13:
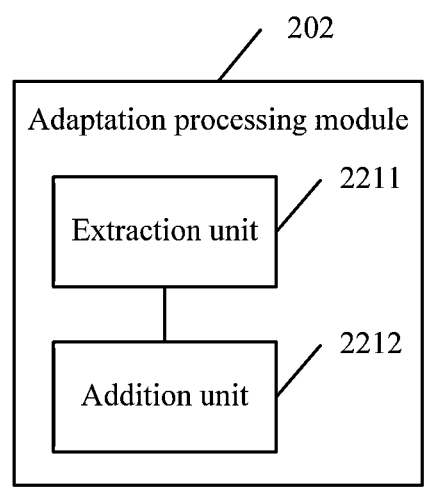
FIG. 13 illustrates a schematic structural diagram of another embodiment of an adaptation processing module according to FIG. 11.

The following introduces the server provided in this embodiment of the present invention in detail with reference to FIG. 11 to FIG. 13. It should be noted that the server described below is applicable to the methods shown in FIG. 2 to FIG. 7, or applicable to the embodiment of the mobile terminal shown in FIG. 8 to FIG. 10.

Referring to FIG. 11, FIG. 11 is a schematic structural diagram of a server according to an embodiment of the present invention. In this embodiment of the present invention, the server may include: a status update acquisition module 201, an adaptation processing module 202, a data update module 203, and a data returning module 204.

The status update acquisition module 201 is configured to acquire original status update data that is requested to be pulled, and the original status update data includes a source video address. The adaptation processing module 202 is configured to perform adaptation processing on the source video address, to generate an adaptive video address.

The data update module 203 is configured to update the original status update data by using the adaptive video address to obtain optimized status update data. The data returning module 204 is configured to return the optimized status update data to a mobile terminal, so that the mobile terminal obtains adaptive video data according to the adaptive video address in the optimized status update data, and plays back the adaptive video data.

The adaptation processing module 202 may be implemented in various ways. For example, in one implementation, also referring to FIG. 12, which is a schematic structural diagram of an embodiment of the adaptation processing module shown in FIG. 11, the adaptation processing module 202 may include: an extraction unit 2201 and an adaptation processing unit 2202.

The extraction unit 2201 is configured to extract the source video address from the original status update data. The adaptation processing unit 2202 is configured to call a video conversion interface of a third-party video website, and convert the source video address into an adaptive video address suitable for the mobile terminal.

In this implementation manner of the present disclosure, before a server returns the status update data to a mobile terminal, the adaptation processing unit 2202 has converted a source video address into an adaptive video address, and completed an entire process of optimization processing of a video, and then the adaptive video address is transmitted, together with optimized status update data, to the mobile terminal. Therefore, the mobile terminal can rapidly obtain adaptive video data according to the adaptive video address and play the adaptive video data, thereby improving a response speed of playback, and improving performance of the mobile terminal.

In another implementation, also referring to FIG. 13, which is a schematic structural diagram of another embodiment of an adaptation processing module shown in FIG. 11, the adaptation processing module 202 may include: an extraction unit 2211 and an addition unit 2212.

The extraction unit 2211 is configured to extract the source video address from the original status update data. The addition unit 2212 is configured to add an address of a proxy CGI to a field of the source video address, to generate an adaptive video address.

In other embodiments of the present invention, the video processing method shown in FIG. 3 may be a human-computer interaction method performed by the units in the server shown in FIG. 11 to FIG. 13. For example, step S201 shown in FIG. 3 and step S302 shown in FIG. 4 may be performed by the status update acquisition module 201 shown in FIG. 11. Step S202 shown in FIG. 3 and step S303 shown in FIG. 4 may be performed by the adaptation processing module 202 shown in FIG. 11. Step S203 shown in FIG. 3 and step S304 shown in FIG. 4 may be performed by the data returning module 204 shown in FIG. 11. Step S403 shown in FIG. 6 may be performed by the extraction unit 2201 shown in FIG. 12. Step S404 shown in FIG. 6 may be performed by the adaptation processing unit 2202 shown in FIG. 12. Step S503 shown in FIG. 7 may be performed by the extraction unit 2211 shown in FIG. 13. Step S504 shown in FIG. 7 may be performed by the addition unit 2212 shown in FIG. 13.

In other embodiments of the present invention, units in the server shown in FIG. 11 may be separately or all combined into one or several other units, or some unit(s) of the units may further be separated into multiple functionally subdivided units; in this way, a same operation can be implemented without affecting an implementation of a technical effect of this embodiment of the present invention. The foregoing units are divided based on logical functions; in an actual application, a function of one unit may also be implemented by multiple units, or functions of multiple units are implemented by one unit. In other embodiments of the present invention, the server may also include other modules. However, in an actual application, these functions may also be implemented with the assistance of other units, and may be implemented by multiple units collaborating with one another.

In other embodiments of the present invention, a computer program (including program code) that can execute the video processing methods shown in FIG. 3, FIG. 4, FIG. 6, and FIG. 7 may run on a computing device, such as a computer that includes a processing component and a storage medium, to construct the server shown in FIG. 11, and to implement the video processing method according to this embodiment of the present invention. The computer program may be recorded in, for example, a computer-readable storage medium, and loaded into the foregoing computing device by using the computer-readable storage medium, and run on the computing device.

The storage medium may include, but is not limited to, a flash memory, a ROM, a RAM, a magnetic disk, or an optical disc.

In this implementation manner of the present disclosure, before the server returns status update data to the mobile terminal, the addition unit 2212 only adds an address of a proxy CGI to a source video address, and performs address conversion without depending on a third-party video website, thereby avoiding a time delay caused by address conversion, and ensuring rapid and normal output of the status update data. In addition, the mobile terminal calls, by using the proxy CGI, a video conversion interface of the third-party video website to perform address conversion only when the mobile terminal needs to play a video in the status update data. Therefore, in such a video on-demand processing manner, more flexible optimization processing can be performed on a video in status update data, thereby reducing an unnecessary operation of address conversion, and reducing resource consumption.

It should be noted that the structure and function of the server in this embodiment can be specifically implemented by using the method in the foregoing method embodiment; for the specific implementation process, reference may be made to related descriptions in the foregoing method, and details are not further described herein.

In this embodiment of the present invention, a server converts a source video address in status update data into an adaptive video address suitable for a mobile terminal, so that the mobile terminal can acquire, according to the adaptive video address, adaptive video data suitable for the mobile terminal to play. Thus, not only the video playback effect and intelligence of a mobile terminal are improved, but also product competitiveness of a social network is improved and user stickiness of the social network is increased.

It can be understood by a person or ordinary skill in the art that all or some procedures for implementing methods of the foregoing embodiments can be implemented by a computer program instructing related hardware. The program may be stored in a computer-readable storage medium, and when being executed, the program may include the procedures of the foregoing embodiments of the methods.

The foregoing disclosures are only preferred embodiments of the present invention, and certainly cannot be used to limit claims of the present disclosure; therefore, equivalent variations made based on the claims of the present disclosure still fall within the scope of the present disclosure.

What is claimed is:

1. A video processing method, comprising:

sending, by a mobile terminal, a request to a server for pulling status update data of a social network, so that the server acquires original status update data that is requested to be pulled, the original status update data including a source video address, wherein the source video address is configured to present a video content in a first playback area when being accessed by the mobile terminal;

performing, by the server, adaptation processing on the source video address to generate an adaptive video address, wherein the adaptive video address has a one-to-one correspondence relationship with the source video address, the adaptive video address being directed to adaptive video data which is modified from original video data at the source video address;

updating, by the server, the original status update data by using the adaptive video address to obtain optimized status update data, and returning the optimized status update data to the mobile terminal; and obtaining, by the mobile terminal, adaptive video data according to the adaptive video address in the optimized status update data, and playing the adaptive video data that presents the video content in a second playback area on the mobile terminal, the second playback area being greater than the first playback area, wherein the step of performing, by the server, adaptation processing on the source video address to generate an adaptive video address comprises:

extracting, by the server, the source video address from the original status update data; and adding, by the server, an address of a proxy common gateway interface (CGI) to a field of the source video address, to generate the adaptive video address, wherein the generated adaptive video address includes both the address of the proxy CGI and the source video address.

2. The method according to claim 1, wherein the step of performing, by the server, adaptation processing on the source video address to generate an adaptive video address comprises:

extracting, by the server, the source video address from the original status update data;

calling, by the server, a video conversion interface of a third-party video website; and converting the source video address into an adaptive video address suitable for the mobile terminal by using the video conversion interface of the third-party video website.

3. The method according to claim 2, wherein the step of obtaining, by the mobile terminal, adaptive video data according to the adaptive video address in the optimized status update data, and playing the adaptive video data comprises:
   sending, by the mobile terminal, an adaptive video acquisition request to the third-party video website according to the adaptive video address in the optimized status update data;
   receiving, by the mobile terminal, the adaptive video data that is returned by the third-party video website and identified by the adaptive video address; and
   playing, by the mobile terminal, the adaptive video data.

4. The method according to claim 1, wherein the step of obtaining, by the mobile terminal, adaptive video data according to the adaptive video address in the optimized status update data, and playing the adaptive video data comprises:
   parsing, by the mobile terminal, the adaptive video address in the optimized status update data, to obtain the address of the proxy CGI and the source video address; and
   sending, by the mobile terminal, an adaptation request to the proxy CGI, wherein the adaptation request comprises the source video address, so that the proxy CGI calls a video conversion interface of a third-party video website, and converts the source video address into an optimized video address suitable for the mobile terminal.

5. The method according to claim 4, further comprising:
   receiving, by the mobile terminal, the optimized video address returned by the proxy CGI, and sending an adaptive video acquisition request to the third-party video website according to the optimized video address;
   receiving, by the mobile terminal, the adaptive video data that is returned by the third-party video website and identified by the optimized video address; and
   playing, by the mobile terminal, the adaptive video data.

6. A mobile terminal, comprising:
   a processor;
   a memory coupled to the processor;
   program modules stored in the memory to be executed by the processor, the program modules comprising:
   a status update pull module configured to send a request to a server for pulling status update data of a social network, so that the server pulls original status update data and processes the original status update data to generate optimized status update data, wherein the original status update data includes a source video address, and the optimized status update data includes an adaptive video address generated by performing adaptation processing on the source video address, and wherein the source video address is configured to present a video content in a first playback area when being accessed by the mobile terminal; the adaptive video address has a one-to-one correspondence relationship with the source video address, the adaptive video address being directed to adaptive video data which is modified from original video data at the source video address; and the adaptive video address is generated by adding a proxy common gateway interface (CGI) to a field of the source video address such that the generated adaptive video address includes both the address of the proxy CGI and the source video address;
   a data receiving module configured to receive the optimized status update data returned by the server; and
   a video playback module configured to obtain adaptive video data according to the adaptive video address in the optimized status update data, and to play the adaptive video data that presents the video content in a second playback area on the mobile terminal, the second playback area being greater than the first playback area.

7. The mobile terminal according to claim 6, wherein the video playback module comprises:
   a video request unit configured to send an adaptive video acquisition request to a third-party video website according to the adaptive video address in the optimized status update data;
   a data receiving unit configured to receive the adaptive video data that is returned by the third-party video website and identified by the adaptive video address; and
   a playback unit configured to play the adaptive video data, wherein the adaptive video address is an adaptive video address that is suitable for the mobile terminal and generated by converting the source video address, and the conversion of the source video address is performed by the server by calling a video conversion interface of the third-party video website.

8. The mobile terminal according to claim 6, wherein the video playback module comprises:
   a parsing unit configured to parse the adaptive video address in the optimized status update data, and to obtain the address of the proxy CGI and the source video address; and
   an adaptation request unit configured to send an adaptation request to the proxy CGI, wherein the adaptation request comprises the source video address, so that the proxy CGI calls a video conversion interface of a third-party video website, and converts the source video address into an optimized video address suitable for the mobile terminal.

9. The mobile terminal according to claim 8, wherein the video playback module further comprises:
   an address receiving unit configured to receive the optimized video address returned by the proxy CGI;
   a video request unit configured to send an adaptive video acquisition request to the third-party video website according to the optimized video address;
   a data receiving unit configured to receive the adaptive video data that is returned by the third-party video website and identified by the optimized video address; and
   a playback unit configured to play the adaptive video data.

10. A server, comprising:
    a processor;
    a memory coupled to the processor;
    program modules stored in the memory to be executed by the processor, the program modules comprising:
    a status update acquisition module configured to acquire original status update data that is requested to be pulled by a mobile terminal, the original status update data comprising a source video address, wherein the source video address is configured to present a video content in a first playback area when being accessed by the mobile terminal;
    an adaptation processing module configured to perform adaptation processing on the source video address, to generate an adaptive video address, wherein the adaptive video address has a one-to-one correspondence relationship with the source video address, the adaptive video address being directed to adaptive video data which is modified from original video data at the source video address;
a data update module configured to update the original status update data by using the adaptive video address to obtain optimized status update data; and
a data returning module configured to return the optimized status update data to the mobile terminal, so that the mobile terminal obtains adaptive video data according to the adaptive video address in the optimized status update data, and plays the adaptive video data that presents the video content in a second playback area on the mobile terminal, the second playback area being greater than the first playback area,
wherein the adaptation processing module is further configured to:
extract the source video address from the original status update data; and
add an address of a proxy common gateway interface (CGI) to a field of the source video address, to generate the adaptive video address, wherein the generated adaptive video address includes both the address of the proxy CGI and the source video address.

11. The server according to claim 10, wherein the adaptation processing module comprises:
an extraction unit configured to extract the source video address from the original status update data; and
an adaptation processing unit configured to call a video conversion interface of a third-party video website, and to convert the source video address into an adaptive video address suitable for the mobile terminal by using the video conversion interface of the third-party video web site.

12. The method according to claim 1, wherein:
the second playback area occupies an entire screen of the mobile terminal.

13. The method according to claim 1, wherein:
the step of adding the address of the CGI to the field of the source video address is performed before the server returns the optimized status update data to the mobile terminal.

14. The method according to claim 4, wherein:
the video conversion interface of the third-party video website is not called before the server returns the optimized status update data to the mobile terminal.

15. The method according to claim 4, wherein:
the video conversion interface of the third-party video website is called only when the mobile terminal receives a use instruction to present the video content in the status update data.

16. The method according to claim 2, wherein:
the step of converting the source video address into the adaptive video address is completed before the server returns the status update to the mobile terminal.

17. The method according to claim 1, wherein:
in response to the request for pulling status update data, only the adaptive video data address is generated by the server without updating the original status update data; and
the original status update data is updated only when the mobile terminal selects to play the video content.

18. The method according to claim 1, wherein:
the generated adaptive video address is an accessible address for the adaptive video data and is a combination of the address of the proxy CGI and the source video address.

* * * * *